United States Patent [19]

San Juan

[11] Patent Number: 5,054,386
[45] Date of Patent: Oct. 8, 1991

[54] CENTRIFUGE BASKET

[75] Inventor: Antonio B. San Juan, Barcelona, Spain

[73] Assignee: Moulinex (Societe Anonyme), Bagnolet, France

[21] Appl. No.: 484,856

[22] Filed: Feb. 21, 1990

[30] Foreign Application Priority Data

Mar. 7, 1989 [FR] France ............... 89 02983

[51] Int. Cl.⁵ .............................. A23N 1/00
[52] U.S. Cl. ....................... 99/511; 99/513; 210/380.1
[58] Field of Search ........... 99/513, 511, 512; 210/380.1, 382; 494/36

[56] References Cited

U.S. PATENT DOCUMENTS

| 2,312,829 | 3/1943 | Bird et al. ........... | 210/380.1 |
| 2,321,207 | 6/1943 | Howe ............... | 210/380.1 |
| 2,802,574 | 8/1957 | Schweppe ............ | 210/380.1 |
| 3,275,153 | 9/1966 | Hirsch ............... | 210/380.1 |
| 3,425,561 | 2/1969 | Steele et al. .......... | 210/380.1 |
| 3,480,148 | 11/1969 | Bryand ............... | 210/380.1 |
| 4,186,096 | 1/1980 | Areaux et al. ........ | 210/380.1 |
| 4,507,006 | 3/1985 | Golob et al. .......... | 99/511 |
| 4,700,621 | 10/1987 | Elger ................. | 99/513 |
| 4,888,965 | 12/1989 | Fanson et al. ........ | 210/382 |

FOREIGN PATENT DOCUMENTS

| 1093961 | 12/1960 | Fed. Rep. of Germany ... | 210/380.1 |
| 1256369 | 12/1967 | Fed. Rep. of Germany ... | 99/511 |
| 0364089 | 10/1962 | Switzerland ............... | 99/511 |
| 2033242 | 5/1980 | United Kingdom .......... | 210/380.1 |

Primary Examiner—William A. Cuchlinski, Jr.
Assistant Examiner—John L. Beres
Attorney, Agent, or Firm—Young & Thompson

[57] ABSTRACT

A centrifuge basket (1) comprising a perforated screen (2) having a surface of rotation with a vertical axis, an upper rim (3) and a lower ring (4) adapted to be coupled in rotation with a drive (5) fixed to a motor shaft. The upper rim (3) comprises dynamic pressure means (8), exerting during rotation of the basket (1) a force (R) oriented downwardly and contributing to maintenance of the connection between the lower ring (4) and the drive (5). Such a basket is particularly useful in domestic centrifuges of the type that might be used in the home.

5 Claims, 1 Drawing Sheet

CENTRIFUGE BASKET

FIELD OF THE INVENTION

The invention relates to centrifuges for domestic use, used to extract the juice of fruits, vegetables or the like, and comprising a motor driving rotatably a basket within a receptacle.

The invention relates more particularly to a centrifuge basket comprising a perforated screen having a surface of rotation with a vertical axis, an upper rim as well as a lower ring adapted to be rotatably coupled with a driver fixed to a motor shaft.

BACKGROUND OF THE INVENTION

In known centrifuges, to avoid the basket rising within the receptacle because of its high speed of rotation (about 12,000 rpm), various mechanical solutions have been provided to maintain the connection between the driver and the basket. For example in certain cases, a closure cover of the receptacle bears, by means of an internal finger, on the bottom of the basket, which has the drawback of having a feed hopper whose opening in the cover is too narrow to introduce large pieces of food. In other cases, the basket is screwed to the drive, which has the drawback of requiring a certain force to unscrew it.

The present invention has for its object to overcome these drawbacks, and has for its object to provide a removable centrifuge basket which will not rise during rotation at high speed.

SUMMARY OF THE INVENTION

According to the invention the upper rim comprises dynamic pressure means, exerting during rotation of the basket a force directed downwardly, and contributing to maintain the connection between the lower ring and the drive.

The present invention therefore has the advantage of using the speed of rotation to prevent the basket from rising thanks to the action of air on the dynamic pressure means, thereby making automatic the cooperation between the basket and the drive. Moreover this device being very simple, it has the advantage of low cost and susceptibility to be mass produced, the dynamic pressure means and the connection being obtained by simple molding of plastic members.

The characteristics and advantages of the invention will become further apparent from the detailed description which follows, by way of example, with reference to the accompanying drawing in which:

DESCRIPTION OF THE PREFERRED EMBODIMENT

Figure 1:
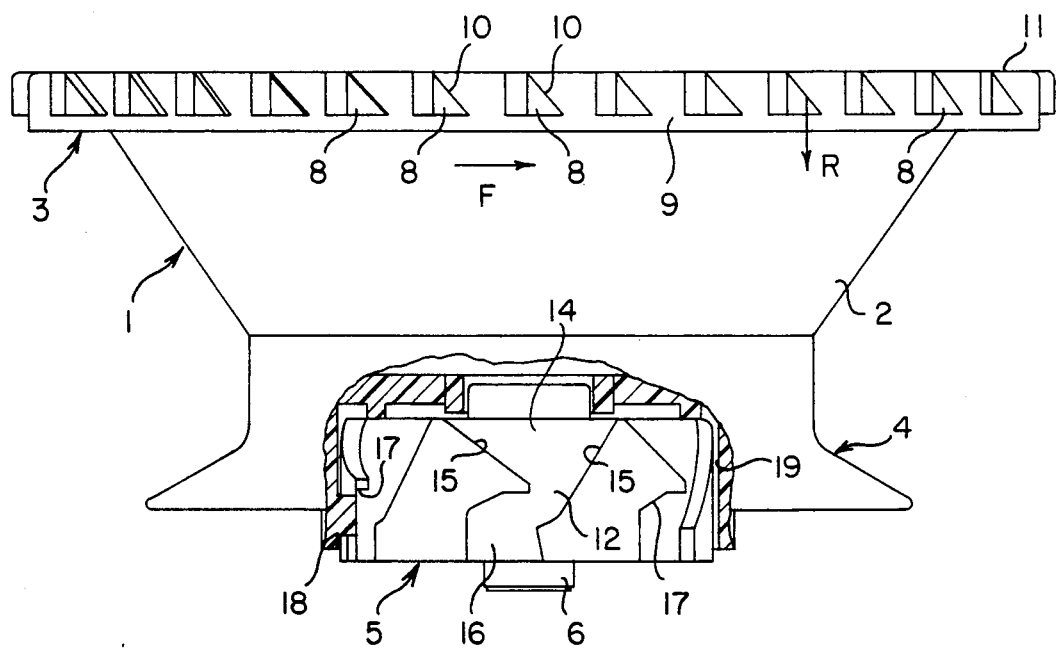
FIG. 1 is an elevational view of the basket according to the invention, partially broken away, showing the connection means of the basket with the drive.

The centrifuge basket 1 shown in FIG. 1 comprises a perforated screen 2 having a truncated conical surface of rotation with a vertical axis, an upper rim 3 as well as a lower ring 4 adapted to be coupled in rotation with a drive 5 fixed to a motor shaft 6.

According to the invention, the upper rim 3 comprises dynamic pressure means, exerting during rotation of the basket a force R directed downwardly, and contributing to maintain the connection between the lower ring 4 and the drive 5.

Thus during rotation of basket 1, air opposes to the rotative movement (arrow F) a resistance force proportional to the speed of rotation. This resistance force is applied horizontally in the direction opposite that of rotation on the dynamic pressure means, said means being constructed such that said pressure force resultant R will be directed downwardly.

The dynamic pressure means are preferably constituted by a plurality of wings 8 disposed regularly about the peripheral surface 9 of the upper rim 3 which each have an active surface 10 inclined both upwardly and in the direction of rotation F of the basket.

Figure 2:
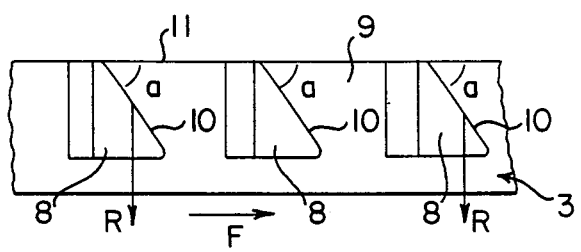
FIG. 2 is a fragmentary view on a larger scale in elevation of the upper edge showing the dynamic pressure means.
Figure 3:
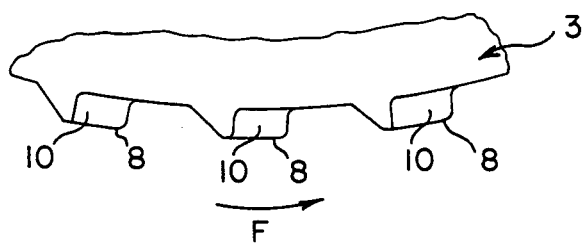
FIG. 3 is a top plan view of FIG. 2.

The active surface 10 of the wings 8 (FIGS. 2 and 3) is an inclined plane and the angle a between said plane 10 and the upper edge 11 of the rim 3 is about 55°, the angle a being calculated such that the pressure R will maintain the connection between the lower ring 4 and the drive 5.

According to a desirable characteristic of the invention, the connection means (FIG. 1) between the drive 5 and the lower ring 4 are constituted respectively by throats 12 which are provided in the peripheral surface of the drive 5, and which each has an inlet 14 forming an introduction ramp 15 as well as a base 16 forming a hook 17 which opens in the direction of rotation F, and by fingers 18 provided on the internal periphery 19 of the ring 4 and adapted to engage beneath the hooks 17.

Thus, upon emplacing the basket 1 on the drive 5, each finger 18 comes into correspondence with an inlet 14 of throat 12, then is automatically guided downwardly by the ramps 15 and, by slight rotation of the basket 1 relative to drive 5 in the direction opposite that of rotation, each finger 18 then penetrates the base 16 of the throat 12, arriving below the hook 17.

During rotation, the pressure force R, applying each finger 18 to the bottom 16 of a throat 12, maintains the basket 1 and prevents its rising.

Upon stopping, it suffices to raise the basket 1 with a slight rotation relative to the drive 5 in the direction of rotation F, so as to disengage fingers 18 from hooks 17, then to raise them through the throat 12, thereby easily separating the basket 1 and the drive 5.

What is claimed is:

1. Centrifuge basket (1) comprising a perforated screen (2) having a surface of revolution with a vertical axis, an upper rim (3) comprising a peripheral surface (9) and an upper edge (11) as well as a lower ring (4) comprising an internal periphery (19) and adapted to be coupled in rotation with a drive (5) which comprises a peripheral surface and which is fixed to a motor shaft (6), said upper rim (3) comprising dynamic pressure means exerting during rotation of the basket (1) a downwardly directed force (R) from the pressure of air on said dynamic pressure means, and helping to maintain the connection between the lower ring (4) and the drive (5).

2. Centrifuge basket according to claim 1, wherein the dynamic pressure means are constituted by wings (8) provided on the peripheral surface (9) of the upper rim (3) which have each an active surface (10) turned both upwardly and in the direction of rotation (F) of the basket.

3. Centrifuge basket according to claim 2, wherein the active surface (10) of the wings (8) is an inclined plane, forming with the upper edge (11) of the rim (3) an angle (a) which is about 55°.

4. Centrifuge basket according to claim 2, wherein said active surface (10) of each wing (8) is fully exposed to air in the direction of rotation (F) of the basket up to the next adjacent wing (8).

5. Centrifuge basket according to claim 1, wherein connection means are arranged between the drive (5) and the lower ring (4) and are constituted by throats (12) which are provided on said peripheral surface of the drive (5), said throats each having an inlet (14) forming an introduction ramp (15) as well as a bottom (16) forming a hook (17) which opens in the direction of rotation (F) of the basket, said connections being further constituted by fingers (18) provided on said internal periphery (19) of the ring (4) and adapted to lodge below the hooks (17).

* * * * *

UNITED STATES PATENT AND TRADEMARK OFFICE
CERTIFICATE OF CORRECTION

PATENT NO. : 5,054,386

DATED : October 8, 1991

INVENTOR(S) : Antonio BASORA SAN JUAN

It is certified that error appears in the above-identified patent and that said Letters Patent is hereby corrected as shown below:

On the title page: Item [19], change "San Juan" to --Basora San Juan--.

Item [75], change the name of the inventor to --Antonio Basora San Juan--.

Signed and Sealed this

Twenty-sixth Day of January, 1993

*Attest:*

STEPHEN G. KUNIN

*Attesting Officer*  *Acting Commissioner of Patents and Trademarks*